US012705403B2

(12) United States Patent
Raval et al.

(10) Patent No.: US 12,705,403 B2
(45) Date of Patent: Aug. 11, 2026

(54) DEVICES AND SYSTEMS FOR ENFORCING CONFIDENTIAL COMPUTING

(71) Applicants: Advanced Micro Devices, Inc., Santa Clara, CA (US); ATI Technologies ULC, Markham (CA)

(72) Inventors: Nippon Raval, Markham (CA); Alexander J. Branover, Boxborough, MA (US); Philip Ng, Markham (CA); Donald Matthews, Jr., Ft. Collins, CO (US); Anthony Asaro, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 76 days.

(21) Appl. No.: 18/622,738

(22) Filed: Mar. 29, 2024

(65) Prior Publication Data

US 2025/0307475 A1 Oct. 2, 2025

(51) Int. Cl.
*G06F 21/78* (2013.01)
*G06F 21/62* (2013.01)

(52) U.S. Cl.
CPC .......... *G06F 21/78* (2013.01); *G06F 21/6218* (2013.01)

(58) Field of Classification Search
CPC ............................. G06F 21/78; G06F 21/6218
See application file for complete search history.

(56) References Cited

U.S. PATENT DOCUMENTS

| | | | | |
|---|---|---|---|---|
| 7,656,189 | B1 * | 2/2010 | Trimberger | H03K 19/17768 326/38 |
| 7,853,992 | B2 * | 12/2010 | Garg | H04L 63/101 726/4 |
| 9,654,465 | B2 * | 5/2017 | Balmakhtar | H04L 63/0254 |
| 10,505,937 | B2 * | 12/2019 | Norris | H04L 63/101 |
| 11,416,620 | B1 * | 8/2022 | Paczkowski | H04L 9/3236 |
| 2004/0250036 | A1 * | 12/2004 | Willman | G06F 21/78 711/163 |
| 2010/0049883 | A1 | 2/2010 | Ben-Yehuda et al. | |
| 2018/0121645 | A1 * | 5/2018 | Petersen | H04L 63/1441 |
| 2019/0028478 | A1 * | 1/2019 | Love | H04L 63/102 |
| 2019/0278494 | A1 | 9/2019 | Dev et al. | |
| 2022/0121574 | A1 | 4/2022 | Lee et al. | |
| 2022/0198034 | A1 * | 6/2022 | Rodriguez | H04L 9/008 |
| 2022/0317927 | A1 * | 10/2022 | Blagodurov | G06F 9/30087 |
| 2023/0153204 | A1 | 5/2023 | Caraccio et al. | |
| 2025/0233852 | A1 * | 7/2025 | Syrivelis | G06F 9/45533 |

OTHER PUBLICATIONS

International Search Report and Written Opinion from the International Searching Authority from corresponding PCT Application No. PCT/US2025/016423, dated Jun. 4, 2025, (8 pages). By: Authorized Officer: Jeong Rok Yang.

* cited by examiner

*Primary Examiner* — Sean D Rossiter
(74) *Attorney, Agent, or Firm* — Greenberg Traurig, LLP

(57) ABSTRACT

The disclosed device includes a device comprising a device-attached memory and a trust controller for confidential computing. The trust controller can maintain a record of devices that are permitted to access the device-attached memory, receive updates to the record, and verify, based on the record, attempts to access the memory.

20 Claims, 10 Drawing Sheets

Host Device 706

Host Memory 740

Physical Processor 730

Trust Controller 702

Fabric 714

Additional Device 710

Device Memory 704

Host-Owned Memory 720

Device-Owned Memory 740

Device Cache 750

Trust Controller 712

DEVICES AND SYSTEMS FOR ENFORCING CONFIDENTIAL COMPUTING

BACKGROUND

Computing systems are growing increasingly complex, and often involve many interconnected devices that each include their own attached physical memory. These devices can share access to their attached memory with other devices in the system. Traditional systems generally rely on a page table or similar data structure to track "ownership" (i.e., the mapping between virtual addresses and physical addresses) of various blocks of memory.

BRIEF DESCRIPTION OF THE DRAWINGS

The accompanying drawings illustrate a number of example implementations and are a part of the specification. Together with the following description, these drawings demonstrate and explain various principles of the present disclosure.

Figure 1:
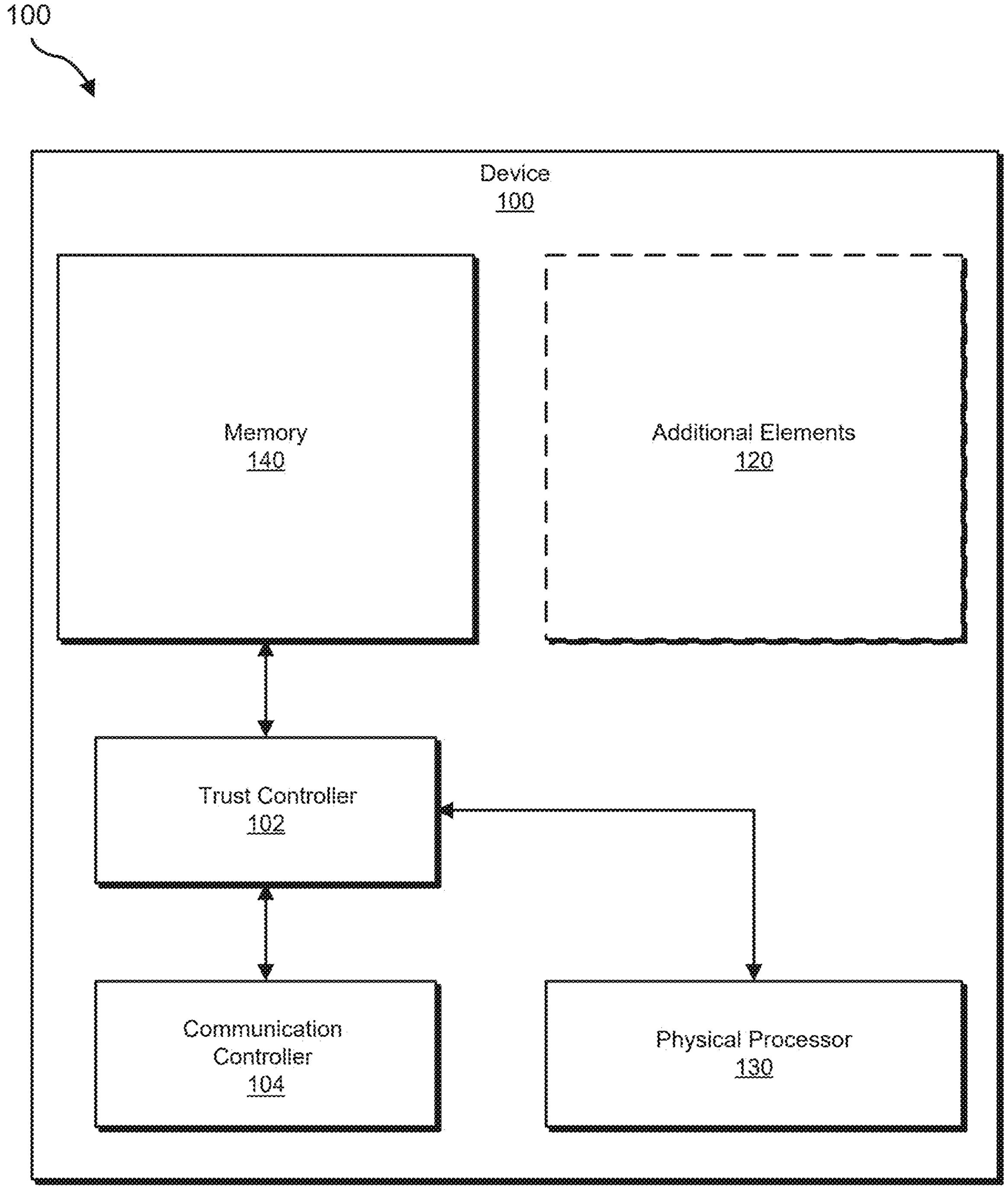
FIG. 1 is a block diagram of an exemplary device for trust controllers attached to a device-attached memory for confidential computing.

Throughout the drawings, identical reference characters and descriptions indicate similar, but not necessarily identical, elements. While the example implementations described herein are susceptible to various modifications and alternative forms, specific implementations have been shown by way of example in the drawings and will be described in detail herein. However, the example implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to devices and systems for enforcing confidential computing. As will be described in greater detail below, devices with attached, built-in, or onboard memory can include a trust controller that allows for on-device verification, independent of a central or host page table, of which devices are permitted to access which physical addresses of the memory. By tracking memory block "ownership" on a per-device level, systems can become more resilient to malicious host updates of the page tables. Additionally, because each device with an attached memory can maintain its own local record of memory block ownership, access requests do not need to be broadcast to the entire system. Instead, only the devices involved in the access request need to update the records stored in their respective trust controllers.

The devices and systems described herein build upon and improve memory access management. For example, the devices and systems could be implemented in the Compute express Link (CXL) framework, adding per-device functionality for verifying memory access requests and improving the overall security of a CXL fabric. Although many of the examples described herein discuss implementation using a CXL framework, any suitable framework for sharing memory across different devices could be used.

Broadly speaking, devices and systems configured according to the principles described herein can include a trust controller (which may be specialized hardware, circuitry, software, firmware, and/or combinations of these) on each connected device that also includes a local or attached memory. The trust controller can maintain a local record of which devices are permitted to access specific memory blocks according to a variety of modes. Moreover, including a trust controller on each device with an attached memory can obviate the need for broadcasting page table updates across the entire fabric; each guest trust controller can work in tandem with a host trust controller to route memory access requests, updating the local information stored on the trust controller when necessary. Although the descriptions included herein frequently use CXL as an example framework, the principles of per-device trust controller s can be extended to any other interconnectivity framework. Trust controllers can verify guest or host ownership for access to a corresponding memory, thereby guarding against malicious host updates of the page tables. Additionally, trust controllers can protect data from other guest devices, hypervisors, and machine managers.

The following will provide, with reference to FIGS. 1-10, detailed descriptions of trust controllers for confidential computing. Detailed descriptions of an example device and system are provided in connection with FIGS. 1 and 2. Detailed descriptions of types of access for memory between additional devices and systems are provided in connection with FIGS. 3-9. Detailed descriptions of corresponding methods for confidential computing will also be provided in connection with FIG. 10.

FIG. 1 is a block diagram of an example device 100 that includes features for enforcing confidential computing. Device 100 corresponds to a component of a computing fabric such as a hardware accelerator, FGPA, ASIC, TPU, NIC, GPU, etc. As illustrated in FIG. 1, example device 100 includes one or more physical processors 130. Processor 130 generally represents any type or form of hardware-implemented processing unit capable of interpreting and/or executing computer-readable instructions. In some examples, processor 130 accesses and/or modifies data stored in memory 140. Examples of processor 130 include, without limitation, chiplets (e.g., smaller and in some examples more specialized processing units that can coordinate as a single chip), microprocessors, microcontrollers, Central Processing Units (CPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), portions of one or more of the same, variations or combinations of one or more of the same, and/or any other suitable physical processor.

The term "confidential computing", as used herein, can refer to computational techniques employed to protect data-in-use against unauthorized access. In the context of a computing fabric and, more specifically, a system that provides virtualization of computing systems for guest systems, confidential computing can include preventing data that is "owned" by a specific guest from being modified, viewed, or accessed by other guests. In some implementations, a system that enforces confidential computing can likewise protect guest data from being modified, viewed, or accessed by the managing hypervisor, or even unauthorized components or processes of the host system.

The term "host", as used herein, can refer to a physical hardware component within a computing environment that provides services to and coordinates other devices within the computing environment. In some implementations, the computing environment can be a computing fabric in which multiple hosts connect to multiple other devices. In some implementations, a host can allow administrator users to configure, monitor, and control resources and services for managing user access and system configurations.

The term "guest", as used herein, can refer to a virtualized representation of a physical device managed by a virtual machine that runs on a host.

The term "device", as used herein, can refer to a discrete collection of hardware components configured to provide a specific functionality or service to a system. In the context of a CXL-based implementation of the concepts presented herein, device can be defined as Type 1 devices, Type 2 devices, and Type 3 devices. In this context, the term "Type 1 device" refers to a device that does not include a host-managed memory. Although Type 1 devices can include memory components, this memory is not accessed by guests, hypervisors, hosts, or other devices. Examples of type 1 devices include, without limitation, specialized accelerators (e.g., network interface controller or NICs) and the like. Likewise, the term "Type 2 device" refers to a device that can coherently access the host CPU's memory as well as provide the host with access to the device memory. In some implementations, a host or other device can access the memory of a Type 2 device. Examples of Type 2 devices include, without limitation, general-purpose accelerators (e.g., GPUs, ASICs, or FPGAs) and the like. Continuing in the explanation of a CXL-based implementation of the concepts presented herein, a Type 3 device represents a device that serves as a dedicated memory expander for the host. Examples of type 3 devices include, without limitation, memory expansion boards, etc.

Furthermore, devices that have their own memory, such as certain kinds of graphical processing units and other CXL Type 2 devices, can access memory in a variety of ways. For example, the device can access the host memory much in the same way as a Type 1 device. In these examples, the memory access request can bypass the device's local trust controller and route directly to the host trust controller, which then facilitates granting the device access to the relevant blocks of host memory.

Figure 4:
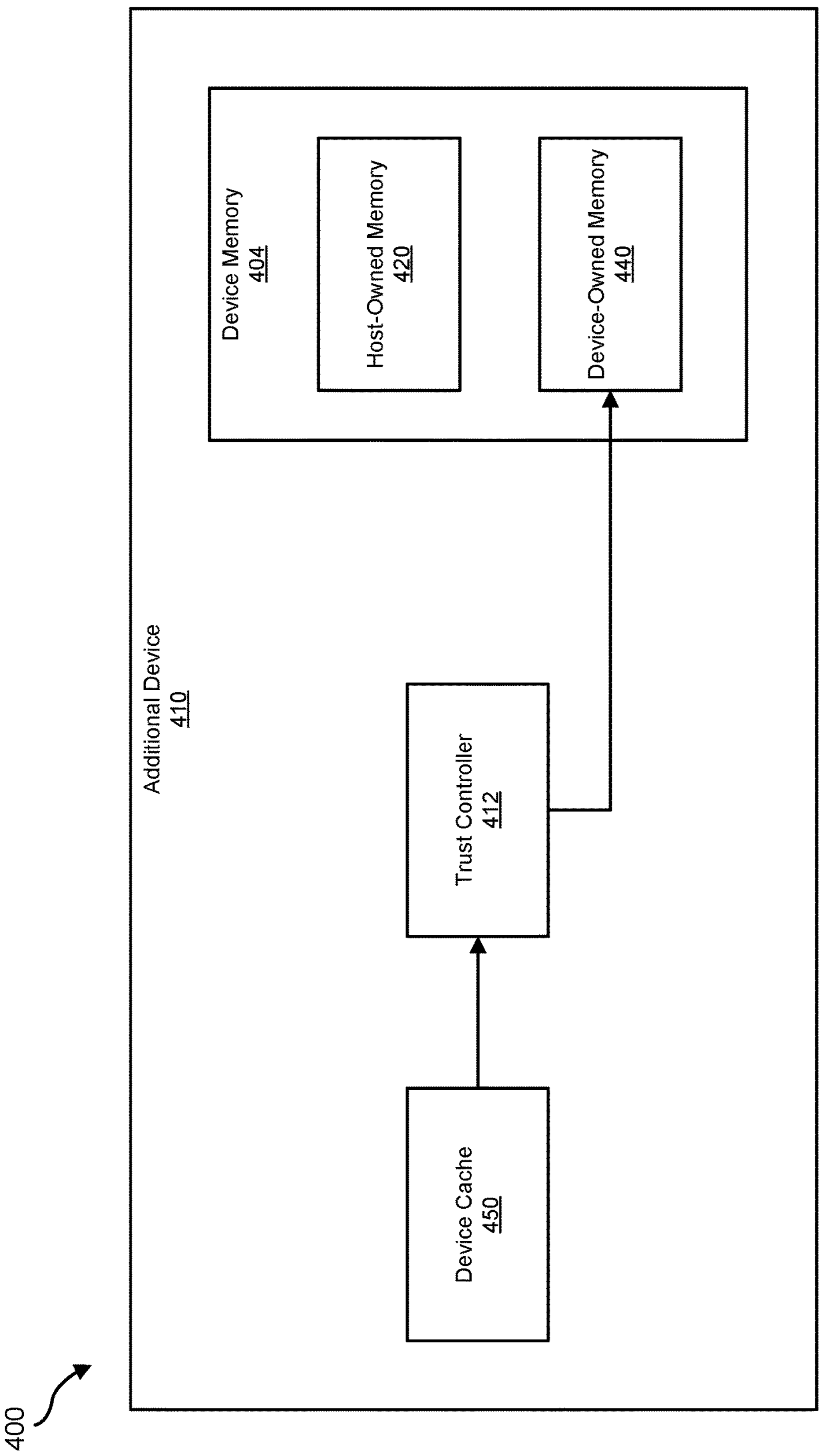
FIG. 4 is a block diagram of an exemplary system for enforcing confidential computing in which an additional device accesses its own attached memory.

In the context of a CXL implementation, a host or a device can be responsible for cache coherency tracking and snoop operations. In this manner, a device that performs trust controller access control checking can also maintain cache coherency. In this manner, a change in coherency tracking ownership can dynamically change the device responsible for tracking coherency. For example, a coherency tracking ownership change to reflect host tracking versus device tracking is known as a host-owned mode, and a coherency tracking ownership change to reflect device tracking versus host tracking is known as a device-owned mode. As illustrated in FIG. 4, a device-attached memory such as device-attached memory 404, can operate in one of two modes: device-owned mode or host-owned mode. A Type 2 device or similar can access its own attached memory in either a device-owned mode or a host-owned mode. In the device-owned mode, the memory access request is routed to the device's local trust controller, which then grants the device access to the correct blocks of the device's attached memory. When the device-attached memory (or a portion thereof) is operating in a device-owned mode, the system guarantees that the host does not have data cached in the device-owned memory. The device can accordingly access the device-owned memory without needing to coordinate memory access with the host. However, the trust controller associated with the device-attached memory can still verify the legitimacy of the access request using the record stored onboard the trust controller as managed and updated by the host system. Continuing to verify the legitimacy of access attempts in this way can ensure that confidential computing continues to be enforced even in situations where the memory access request is not transmitted to the host device.

In a host-owned mode, the device-attached memory (or portion thereof) is treated like any other host-attached memory. If the device needs to access data stored in host-owned memory, the device must first send a memory access request to the host. Furthermore, the memory access request can involve both the host's trust controller and the device's trust controller to facilitate a coherency tracking ownership change from host-owned to device-owned for the requested memory blocks. The device's trust controller can then take over managing the memory access request.

In further examples, a host can access host-owned memory of a device. In these examples, the host's memory access request is routed to the device's trust controller, which then facilitates the host's access to the host-owned memory blocks of the device's attached memory. In some implementations, the host can bypass the device's trust controller to access the host-owned memory blocks of the device's attached memory.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

The term "trust controller", as used herein, can refer to a component or portion of a device configured to enhance the security and trustworthiness for enforcing confidential computing that can be incorporated into any device or host that includes a memory. For example, a host system can include a trust controller associated with a memory of the host system, and a device can include a trust controller associated with a memory of that device. In some embodiments, a trust controller can be implemented using hardware, circuitry, software, firmware, and/or combinations of the same to enhance the security and trustworthiness for enforcing confidential computing. In general, a trust controller can maintain a record of memory assignments and receive updates to the record from the host system. Trust controllers can use this record to verify the validity of attempts to access the memory for which they are responsible. For example, trust controllers can perform a source validation check to verify whether the host has granted a requesting device seeking to access a portion of the memory permission to do so. In doing so, trust controllers can ensure only entities that have explicitly been given permission to access a block of data are able to do so, thereby guarding against malicious host updates of the page tables. In some embodiments, a trust controller can verify a memory access request using an Address Space Identifier (ASID) included in the request. Additionally or alternatively, a trust controller can verify a memory access request based on a combination of source ID and Process Address Space Identifier (PASID). In the context of a CXL implementation, trust controllers can be used in the system for enforcing confidential computing; however, a CXL implementation is not necessary to use trust controllers in a system. Furthermore, all access to any given memory of any device can be routed through an associated trust controller. Detailed examples of various memory access attempts involving different types of devices will be provided in greater detail below. As will be described in greater detail below, a trust controller can receive updates from a virtual machine manager, hypervisor, operating system, security processor, or other entity with the highest trust level in a given system. Additionally, trust controllers can be included on any device that includes a host-managed memory, including the host itself.

In some implementations trust controllers can be used for secure cloud computing, secure payment systems, and secure remote access. In further implementations, trust controller can perform source checking for peer-to-peer operations.

As illustrated in FIG. 1, device 100 includes a trust controller as well as a device-attached memory, illustrated here as memory 140. Memory 140 generally represents any type or form of volatile or non-volatile storage device or medium capable of storing data and/or computer-readable instructions. Memories, including memory 140, typically use addresses that correspond to specific portions of the physical memory (e.g., physical coordinate ranges of a HDD) as a shorthand to aid in memory management and determining what data is stored where. Similarly, virtual addresses can be used to represent logical or virtual memory locations. Virtual addresses can provide an abstraction layer without the constraints of specific physical memory layout or limitation, enabling systems to run programs that require more memory than is physically present. A memory management unit (MMU) can perform the address translation to map virtual addresses corresponding to physical addresses as well as assign mappings between virtual and physical addresses. In FIG. 1, memory 140 is attached to or included as part of device 100. As a specific example, device 100 can represent a hardware accelerator (such as a GPU) that includes an onboard memory. The ownership of memory 140 by device 100 can be managed by an operating system to help maintain stability, security, and memory between different devices and processes.

The term "hypervisor" or a "virtual machine manager" as used herein can refer to software that enables the management and coordination of hardware devices, such as the host, and software applications, such as the guest device. Accordingly, in a system with multiple host and guest devices, a hypervisor can be responsible for managing and coordinating memory mapping for devices, allowing them to assess specific memory regions directly. For example, a host or host hypervisor can assign the ownership of a memory block from memory 140 to a particular device and push an update to trust controller 102 in a timely manner, especially in the event of a guest ownership change.

In the context of operating systems, a hypervisor generally allows a host device to support multiple guests. The hypervisor emulates or virtualizes hardware components for the guest to use via the virtual machine. These virtualized hardware components are presented to the guest operating system inside the virtual machine as if they were physical hardware components, including memory and memory addresses. As mentioned earlier, the MMU performs translations between the virtual and physical addresses, while the Address Translation Cache (ATC) of a given physical device can store the mapping of the virtual to physical addresses translated from the MMU.

The term "address translation cache" and the corresponding abbreviation "ATC" as used herein can refer to a memory cache that stores information about recent translations of virtual memory to physical memory, thereby reducing the time taken to access a specific memory address in response to an access request. ATCs can also be referred to as translation lookaside buffers (TLB) or content-addressable memories.

As previously mentioned above, trust controller 102 generally represents any type or form of hardware-implemented component of a device that can maintain an updatable record of which devices are able to access specified addresses of an associated physical memory. Trust controller 102 can then use this record to verify attempts to access the associated memory, thereby providing on-device access control to increase a computing fabric's resilience against malicious access of data-in-use. In the example of FIG. 1, trust controller 102 maintains a record of devices that are permitted to access the memory 140, receives the updates to the record, and verifies, based on the record, attempts to access memory 140. Additionally, trust controller 102 can receive updates from a host device or a component of a host device, such as an MMU or CPU. Trust controller 102 can update its record of memory assignments or ownership based on these updates.

In one example, trust controller 102 can include a guest ID included in the memory access request to the record stored on trust controller 102. In some embodiments, the guest ID can be an address-space identifier (ASID). In further embodiments, the guest ID can be a combination of a source ID and a process address-space identifier (PASID).

Device 100 can also include additional elements 120 and/or communication controller 104, depending on the exact configuration of device 100. In some examples, the additional elements can include an address translation cache (ATC), local working cache, additional physical processors, page tables, or any other suitable computing component. In some examples communication controller 104 can facilitate communication between device 100 and other communicatively coupled devices.

As can be appreciated from the above description, any device in a fabric computing environment that includes a device-attached memory can include a trust controller that verifies attempts to access the associated memory. In this system, an ownership update (e.g., a host device or system assigning a particular block of memory to a device, changing a memory assignment, revoking an assignment, etc.) can trigger an update to the trust controller of the device that includes the physical memory being assigned. In some implementations, a system can grant ownership of a portion of a device memory to a virtualization hypervisor or guest.

Figure 2:
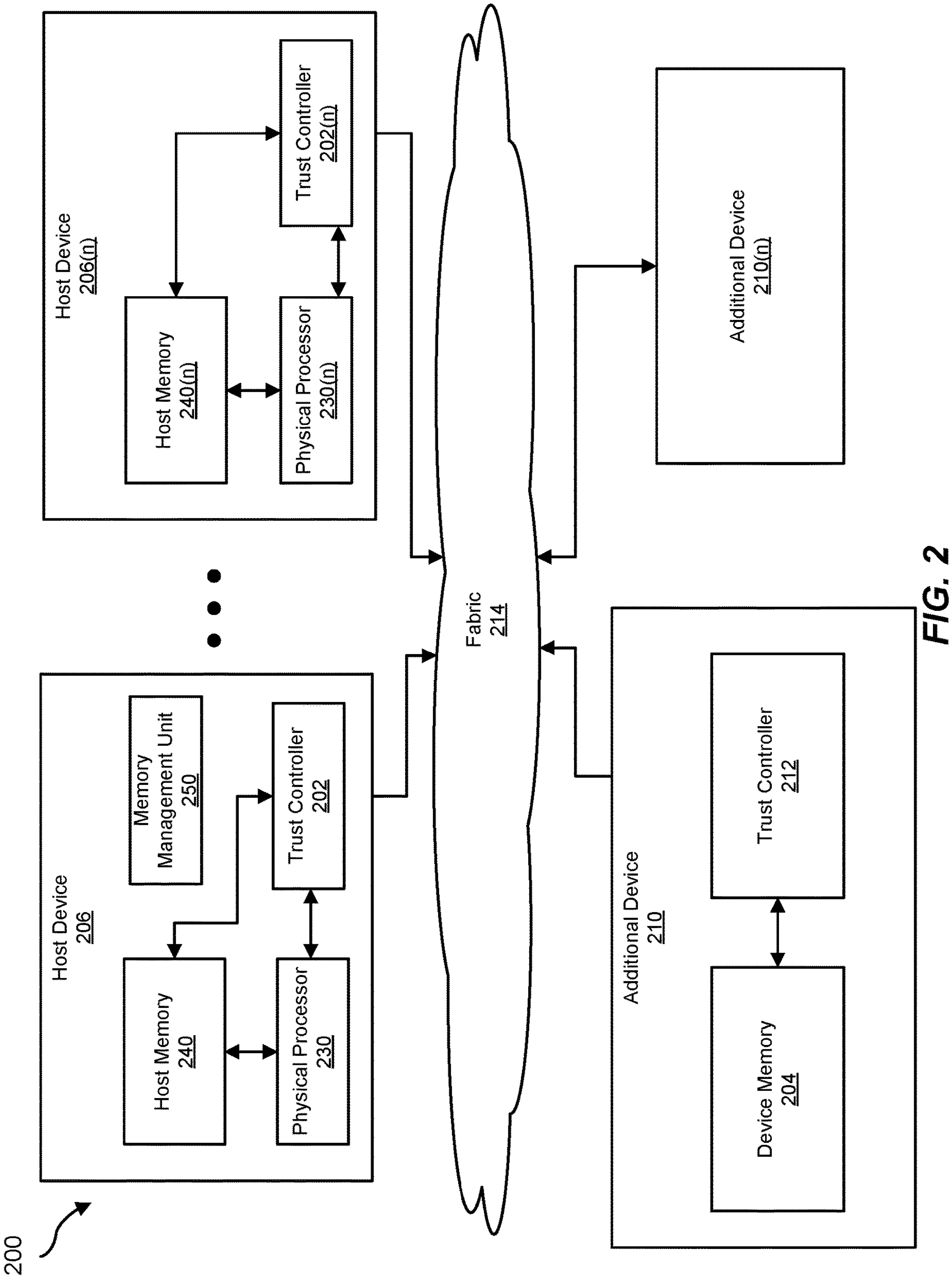
FIG. 2 is a block diagram of an exemplary system for enforcing confidential computing.

FIG. 2 is a block diagram of an exemplary system 200 for enforcing confidential computing. FIG. 2 illustrates a host device 206 including a host memory 240, a physical processor 230, a trust controller 202, and an MMU 250. A computing fabric can include an arbitrary number of hosts, illustrated here as host device 206(*n*) which includes host memory 240(*n*), physical processor 230(*n*), and trust controller 202(*n*). Example system 200 also includes an additional device 210 including a device memory 204 and trust controller 212 attached to the device memory 204. System 200 can also include an arbitrary number of additional devices, illustrated here as additional device 206(*n*) connected via fabric 214. Host device 206 and additional device 210 can communicate across fabric 214 in a variety of ways. In some examples, system 200 can use the CXL standard to facilitate memory management requests between hosts and devices connected to fabric 214. Moreover, host device 206 updating ownership of one or more memory addresses can cause all entries related to the affected addresses in a cache and ATC of additional device 210 to be invalidated or purged.

The term "host device" as used herein can refer to a device that manages the memory of other devices, such as by assigning specific addresses of physical memory for use by specific devices. In some implementations, a host device can include a central processing unit (CPU). Some components of a host device can work in tandem with other optional components for the purposes of managing the memory of various devices. For example, a host device can include GPUs, network interfaces, storage devices (e.g., memory), MMUs, etc.

Devices, such as certain kinds of hardware accelerators and other CXL Type 1 devices, frequently require access to a host's attached memory. In these situations, the device initiates a request to its local cache to check for the required memory block. In the event of a cache miss, the device can send a memory access request to the host's trust controller that then facilitates granting the device access to the relevant blocks of the host memory.

The term "fabric", as used herein, can refer to a communicatively coupled network of computing nodes or devices arranged into a single consolidated system. In some implementations, fabrics can be implemented using a variety of standards, including via CXL as described in greater detail above. In further implementations fabrics can be used in various computing systems, cloud computing infrastructures, and computing clusters.

Host device 206(*n*), which includes host memory 240(*n*), physical processor 230(*n*) and trust controller 202(*n*), represents any number of host devices connected via fabric 214. Furthermore, various components of host device 206 can issue updates to the record of trust controller 202. For example, if a host grants a guest access to host memory 240 or a device memory 204, the ownership update can originate from a processor, MMU, or another component of host device 206. Host device 206 can broadcast memory block ownership updates to trust controller 212 of additional device 210 and/or any other devices such as additional device 210(*n*) connected to the host device 206 in system 200.

As mentioned earlier, various components of a host device can initiate an update to one or more trust controllers. For example, MMU 250 in host device 206 can initiate updates to the record of trust controller 202 in response to MMU 250 assigning ownership of a particular block of memory hosted on host memory 240. In this example, an update can be made to the record of the trust controller 202 by listing the new ownership of a particular block of memory in response to receiving an ownership update from MMU 250. In some implementations, physical processor 230 in host device 206 can initiate updates to the record of trust controller 202 in response to a change in ownership of a particular block of memory hosted on host memory 240 (e.g. hypervisor, guest device). Similarly, host device 206 can initiate an update to the record of trust controller 212 as part of a change in ownership of a particular block of memory hosted on device memory 204.

Figure 3:
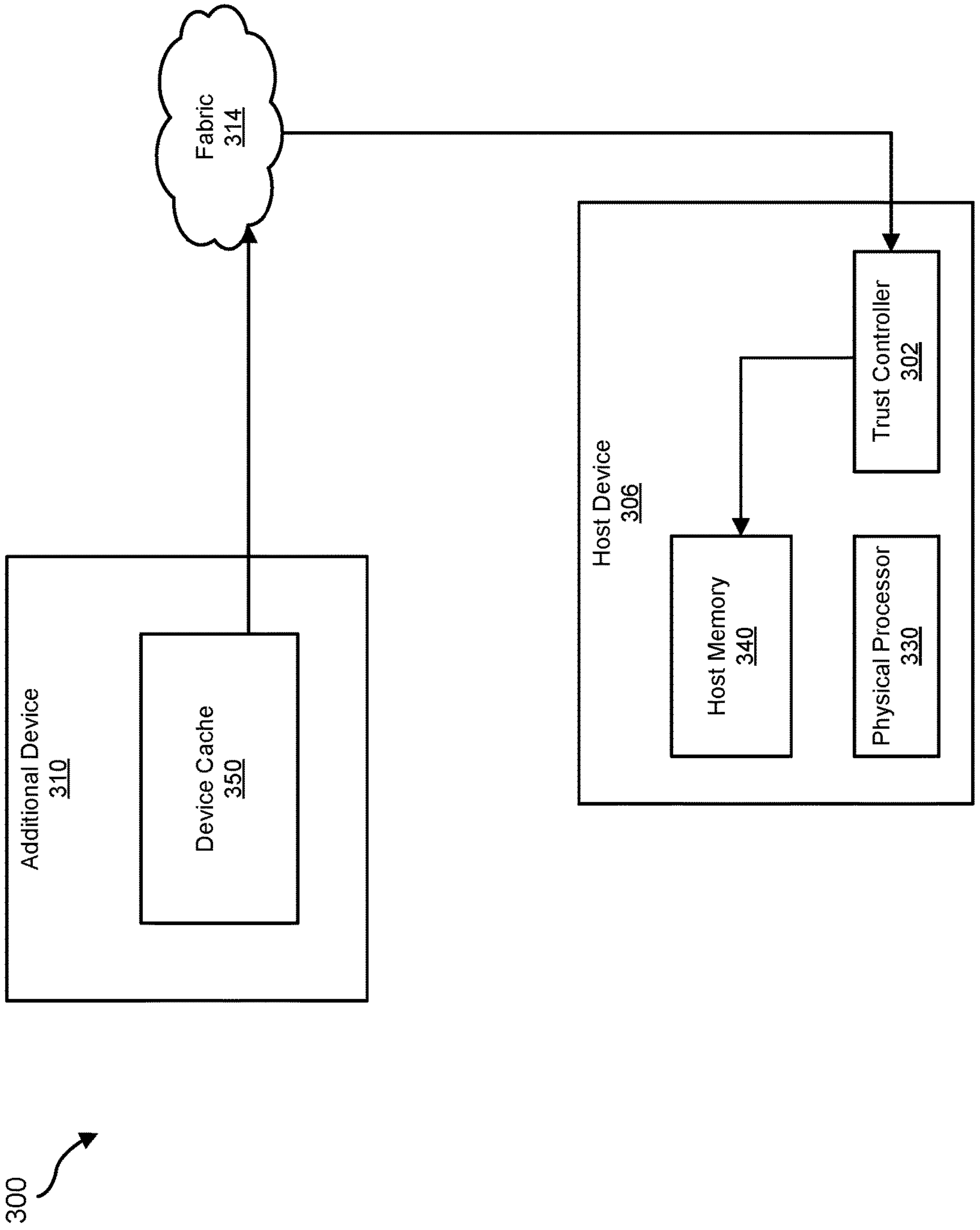
FIG. 3 is a block diagram of an exemplary system for enforcing confidential computing in which an additional device accesses a host memory.

FIG. 3 illustrates an example system 300 of an additional device 310 that can access a host memory 340 routed through a trust controller 302 of host device 306. In the context of a CXL implementation, as illustrated in FIG. 3, additional device 310 is a Type 1 device because additional device 310 does not include a host-managed memory. That is, additional device 310 does not include a memory that host device 306 is permitted to access or manage. Additional device 310 does, however, include an onboard cache which is illustrated here as device cache 350. However, device cache 350 is private to additional device 310, and access to device cache 350 is not shared with other devices. Device cache 350 therefore does not represent host-owned memory. As illustrated in FIG. 3, a memory request from additional device 310 to access a host memory 340 can be routed through a trust controller 302 of the host device 306. Host device 306 can include a host memory 340, physical processor 330, and a trust controller 302, where additional device 310 and host device 306 communicate via fabric 314.

In some implementations, an update to the record of trust controller 302 can trigger the flushing of device cache 350. Device cache 350 can be flushed to prevent a new owner of the memory block or malicious process from gaining unauthorized access to data stored in device cache 350. For example, when host device 306 assigns ownership of a portion of host memory 340 to a guest device or hypervisor, host device 306 can likewise add a corresponding entry to the record of trust controller 302. Host device 306 can then cause device cache 350 to invalidate, delete, or flush the data associated with the assigned addresses to ensure that the guest device or hypervisor cannot access or retrieve unauthorized data. If additional device 310 later needs to access the data stored in host memory 340, additional device 310 can transmit a memory access request in the form of a CXL.cache command over fabric 314 to host device 306. Trust controller 302 can examine the source and guest ID of the requested memory block, comparing these values to the record stored in trust controller 302 to verify that additional device 310 is permitted to access the relevant block of memory in host memory 340. If the values match the record of trust controller 302, then trust controller 302 will grant additional device 310 access to the requested block of host memory 340. If the values do not match, then trust controller 302 will block the access attempt.

In some implementations, additional device 310 can attempt to access a translation from a virtual address to a physical address stored in its address translation cache (also referred to as an ATC or TLB, not illustrated in FIG. 3). As mentioned earlier, an ATC can cache mappings of virtual addresses to physical addresses based on information retrieved from the MMU of the host device that originally made the memory assignments. If the ATC does not include the translation of the virtual address mapping as needed, additional device 310 request the relevant information from the host MMU, located in host device 306. For example, trust controller 302 can use the address translation from the ATC to check if a request for a virtual address is permitted based on the record of trust controller 302 for the associated physical address.

FIG. 4 illustrates an example system 400 in which an additional device 410, including a device cache 450, can access a device-owned memory 440 routed through a trust controller 412 of additional device 410. In the context of a CXL implementation, illustrated in FIG. 4, additional device 410 is a Type 2 device because additional device 410 includes its own device-attached memory 404 that can be managed by a host device, such as host device 206 in FIG. 2. Furthermore, the device-attached memory 404 can optionally include either or both of a block of host-owned memory 420 and a block of device-owned memory 440. In some implementations, the block of device-owned memory 440 can be configured to operate in a device-owned mode.

Figure 5:
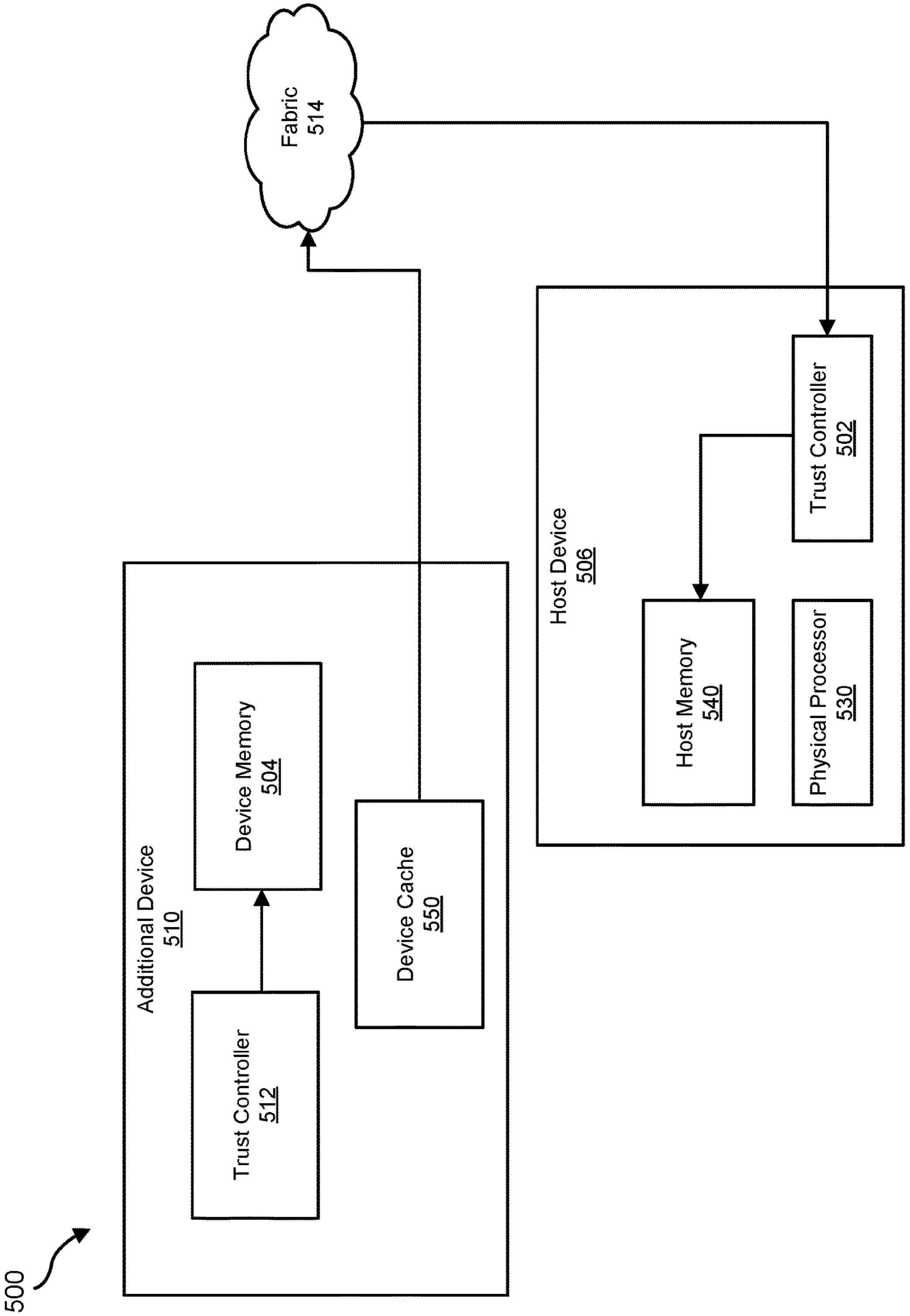
FIG. 5 is a block diagram of an exemplary system for enforcing confidential computing in which an additional device accesses host-owned memory stored on a memory of the host device.

FIG. 5 illustrates an example system 500 in which an additional device 510 attempts to access a host memory 540. In the event of the cache miss while attempting to retrieve data from device cache 550, additional device 510 can send a memory access request to trust controller 502 of host device 506. Trust controller 502 can examine the source and guest ID of the requested memory block, comparing these values to the record stored in trust controller 502 to verify that additional device 510 is permitted to access the relevant block of host memory 540. As shown in FIG. 5, host device 506 can include a physical processor 530 and a memory access attempt, transmitted via fabric 514, that is routed through trust controller 502 of host device 506. Of note, trust controller 502 verifies the attempt to access host memory 540 rather than trust controller 512 because trust controller 502 is associated with host memory 540 whereas trust controller 512 is associated with device memory 504. As described above, a host device such as host device 506 can update the records of one or more trust controllers, such as trust controllers 502 and 512. An update to the record of trust controller 512 can trigger the flushing of device cache 550 if device cache 550 has cached data that was stored in a block of host memory 540 that changed ownership. Device cache 550 can be flushed to prevent a new owner of the memory block from gaining unauthorized access to the data that was originally stored in the reassigned memory block by accessing data stored in device cache 550.

Figure 6:
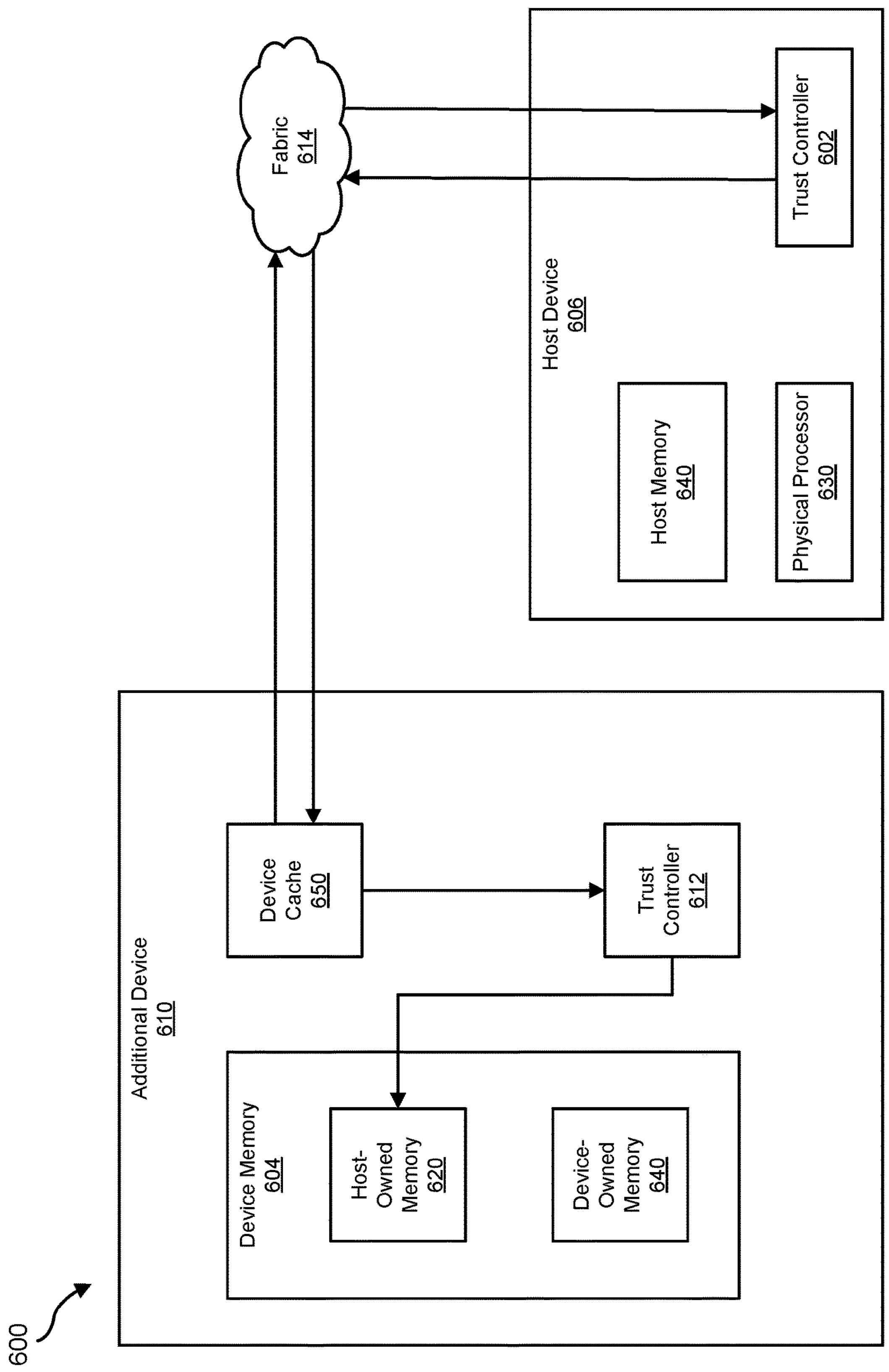
FIG. 6 is a block diagram of an exemplary system for enforcing confidential computing in which an additional device accesses host-owned memory stored on a device-attached memory.

FIG. 6 illustrates an example system 600 in which an additional device 610 attempts to access a host-owned memory 620 stored on a device memory 604. In some implementations, the block of host-owned memory 620 can be configured to operate in a host-owned mode. As described earlier, host-owned memory 620 can be treated like any other host-attached memory, such as host memory 640. As shown in FIG. 6, a physical processor 630 can be part of host device 606 and a memory access attempt to host-owned memory 620, which is transmitted via fabric 614, is routed through a device cache 650 and trust controller 612 of additional device 610. Consequently, additional device 610 must send a request to host device 606 to access a host-owned memory 620. Trust controller 602 can examine the source and guest ID of the requested memory block, comparing these values to the record stored in trust controller 602 to verify that additional device 610 is permitted to access the relevant block of host memory 640. Once trust controller 602 verifies that additional device 610 can access the block of host memory 640, host device 606 can update the ownership of the host-owned portion in a host-owned memory 620 of a device memory 604 to a device-owned portion in a device memory 604. Following the coherency tracking ownership change, additional device 610 can route memory requests through what is now a device-owned portion of the device memory 604 (formerly host-owned memory 620).

Figure 7:
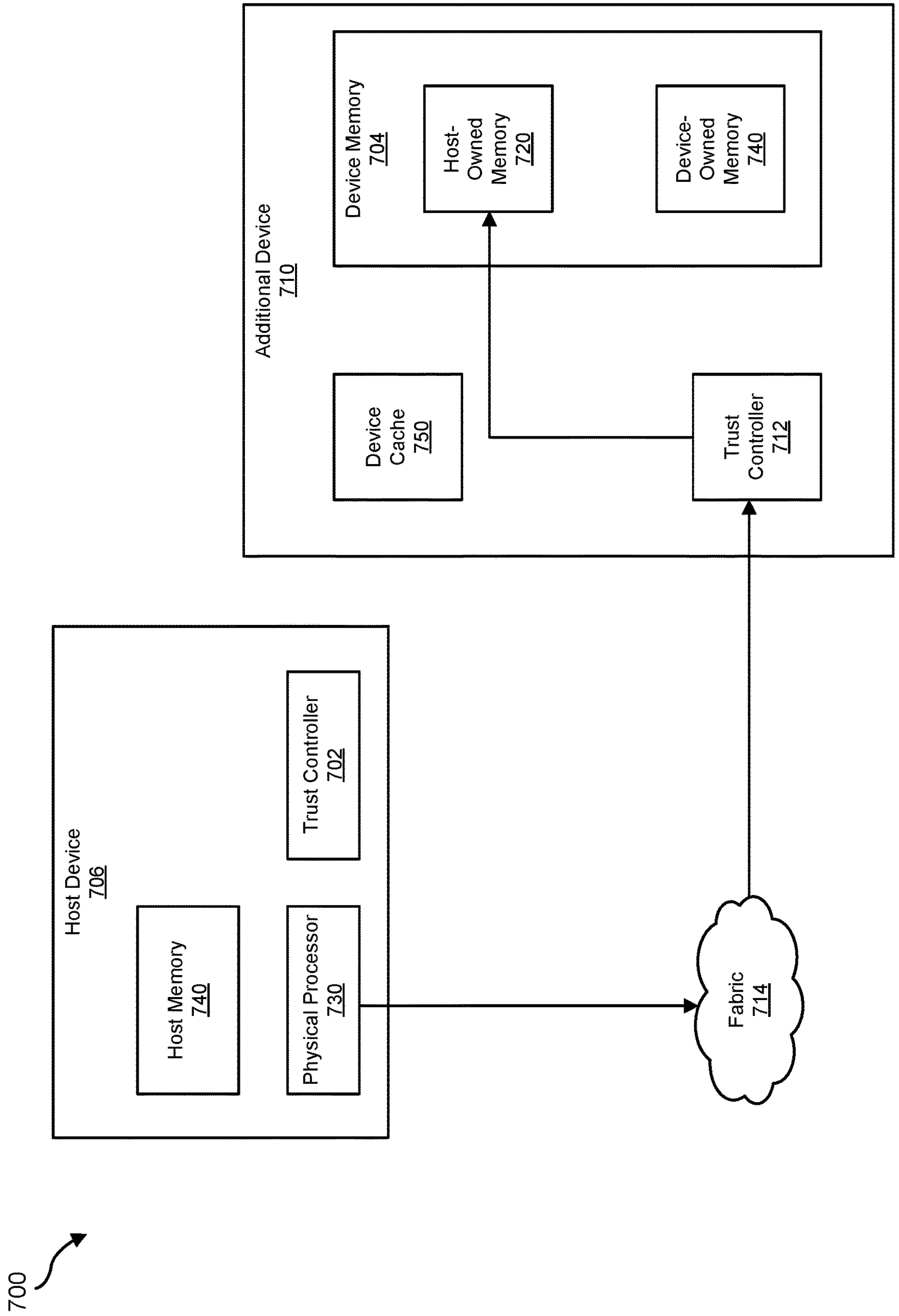
FIG. 7 is a block diagram of an exemplary system for enforcing confidential computing in which a host device accesses a host-owned block of memory stored on a memory of the additional device.

FIG. 7 illustrates an example system 700 in which a host device 706, including a trust controller 702 and a physical processor 730, attempts to access a host-owned memory 720 stored on a device memory 704. As illustrated in FIG. 7, a memory request from host device 706 to access a host-owned memory 720 can be routed through a trust controller 712 of the additional device 710. Host device 706 can transmit a memory access request to a host-owned memory 720 in the form of a CXL.mem command over fabric 714 to additional device 710 Trust controller 712 can examine the source and guest ID of the requested memory block, comparing these values to the record stored in trust controller 712 to verify that host device 706 is permitted to access host-owned memory 720.

When the access request comes from the host device 706, host device 706 can bypass trust controller 712 of additional device 710. Host device 706 can accordingly access the host-owned memory 720 without needing to verify ownership. However, the trust controller 712 can still verify the legitimacy of the access request using the record stored onboard trust controller 712 as managed and updated by the additional device 710. Continuing to verify the legitimacy of access attempts, can ensure that confidential computing continues to be enforced even in situations where the memory access request is transmitted from the host device.

In some implementations, updates to the record of the trust controller that specify a change in ownership (e.g. guest device, hypervisor) of device-owned memory 740, can trigger device memory 704 to sanitize (e.g. overwrite with a constant value) the block of device-owned memory 740. Device-owned memory 740 can be sanitized prevent the new owner of the memory block from gaining unauthorized access to data stored in the block of device-owned memory 740. Correspondingly, device cache 750 can also flush or sanitize any corresponding addresses to protect data stored by additional device 710 and ensure that confidential computing standards are enforced.

Figure 8:
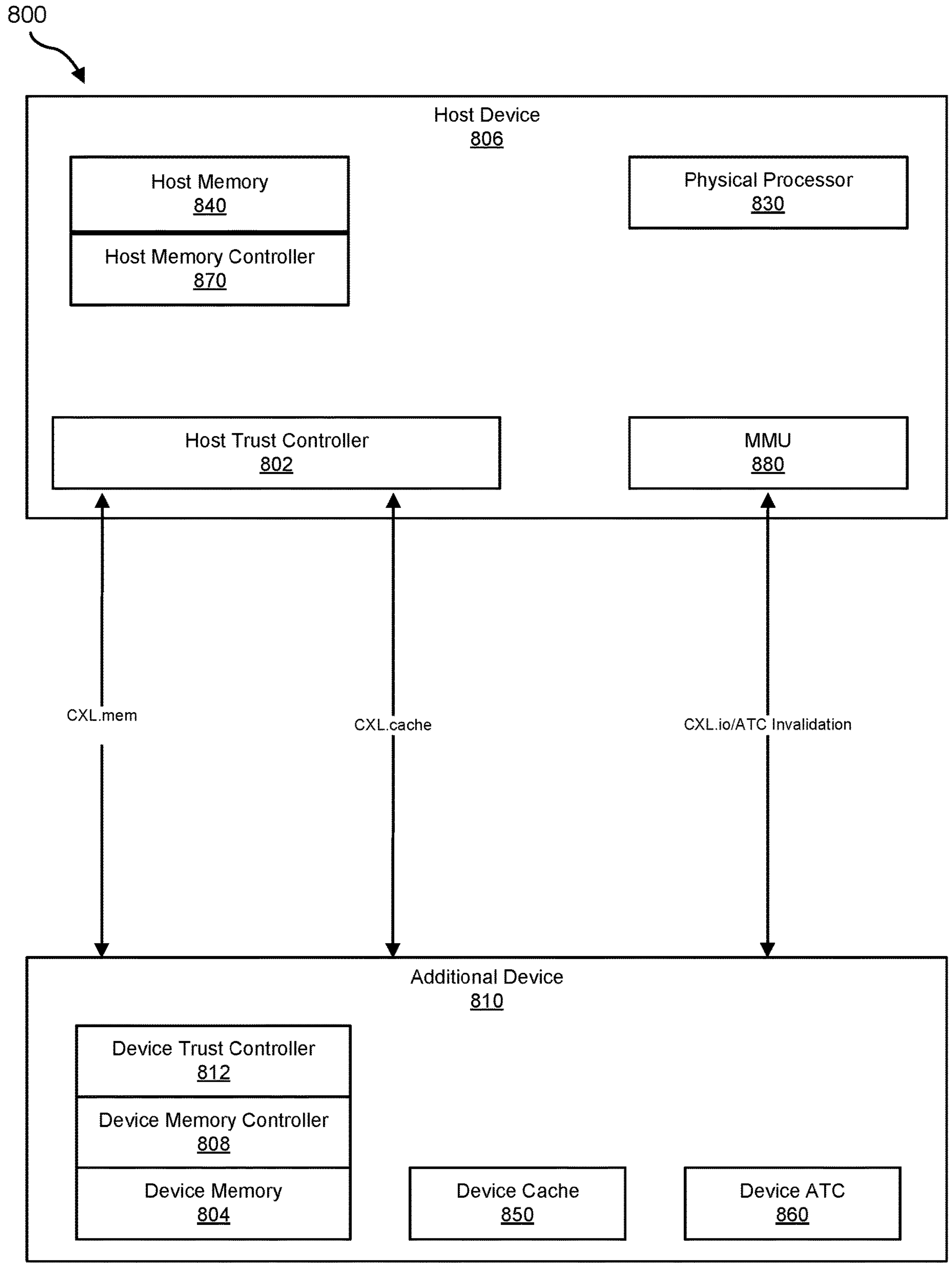
FIG. 8 is a block diagram of an exemplary CXL implementation of an example system for enforcing confidential computing.

FIG. 8 illustrates an example CXL-based implementation system 800 of host device 806 and additional device 810. Additional device 810 can include device trust controller 812, device memory controller 808, device memory 804, device cache 850, and device ATC 860. Host device 806 can include device host trust controller 802, host memory controller 870, host memory 840, MMU 880, and physical processor 830. As illustrated in FIG. 8, additional device 810 can transmit a memory access request in the form of a CXL.mem and/or CXL.cache command to host trust controller 802. In further implementations, additional device 810 can transmit a memory request in the form of a CXL.io/ATC invalidation to MMU 880. Type 1 devices can transmit memory access requests in the form of a CXL.io and/or a CXL.cache command, as described in FIG. 3. Type 2 devices can transmit memory access requests in the form of a CXL.io, CXL.cache, and/or CXL.mem command as described in FIG. 7. Type 3 devices can transmit memory access requests in the form of a CXL.io and/or CXL.mem command. In some implementations, CXL.cache can enable additional device 810 to efficiently access a host memory 840 for optimal performance.

Figure 9:
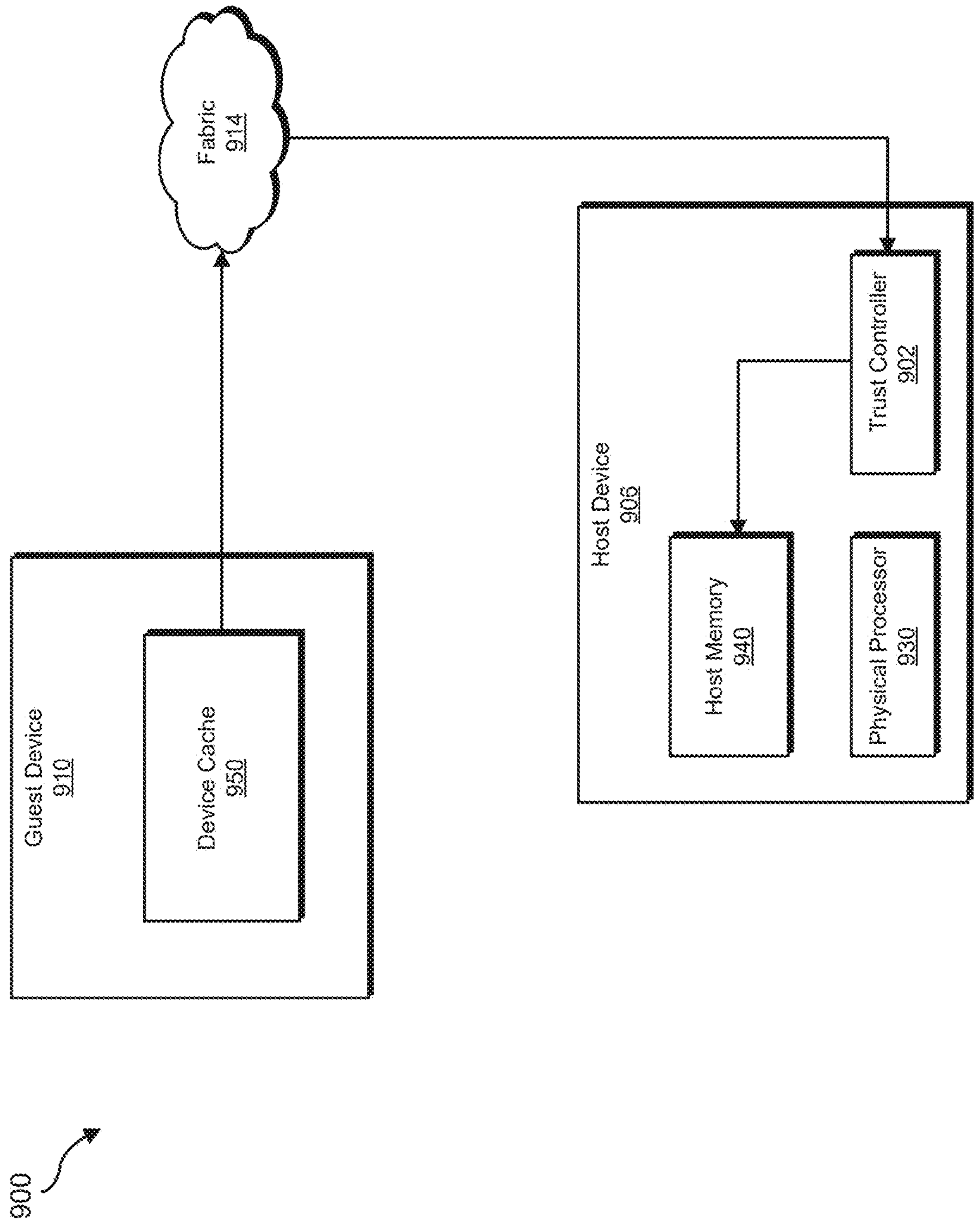
FIG. 9 is a block diagram of an exemplary system for enforcing confidential computing in which a guest device accesses a host memory.

FIG. 9 illustrates an exemplary system 900 of a guest device 910 that can access a host memory 940 routed through a trust controller 902 of host device 906. Guest device 910 does includes an onboard cache which is illustrated here as device cache 950. As illustrated in FIG. 9, a memory request from guest device 910 to access a host memory 940 can be routed through a trust controller 902 of the host device 906. Host device 906 can include a host memory 940, physical processor 930, and a trust controller 902, where guest device 910 and host device 906 communicate via fabric 914. In some implementations, guest device 910 can include additional elements (e.g., memory).

As illustrated in FIG. 9, guest device 910 can independently access the data stored in host memory 940. For example, trust controller 902 can examine the source and guest ID of the requested memory block, comparing these values to the record stored in trust controller 902 to verify that guest device 910 is permitted to access the relevant block of memory in host memory 940. If the values match the record of trust controller 902, then trust controller 902 will grant guest device 910 access to the requested block of host memory 940. If the values do not match, then trust controller 902 will block the access attempt of guest device 910.

Figure 10:
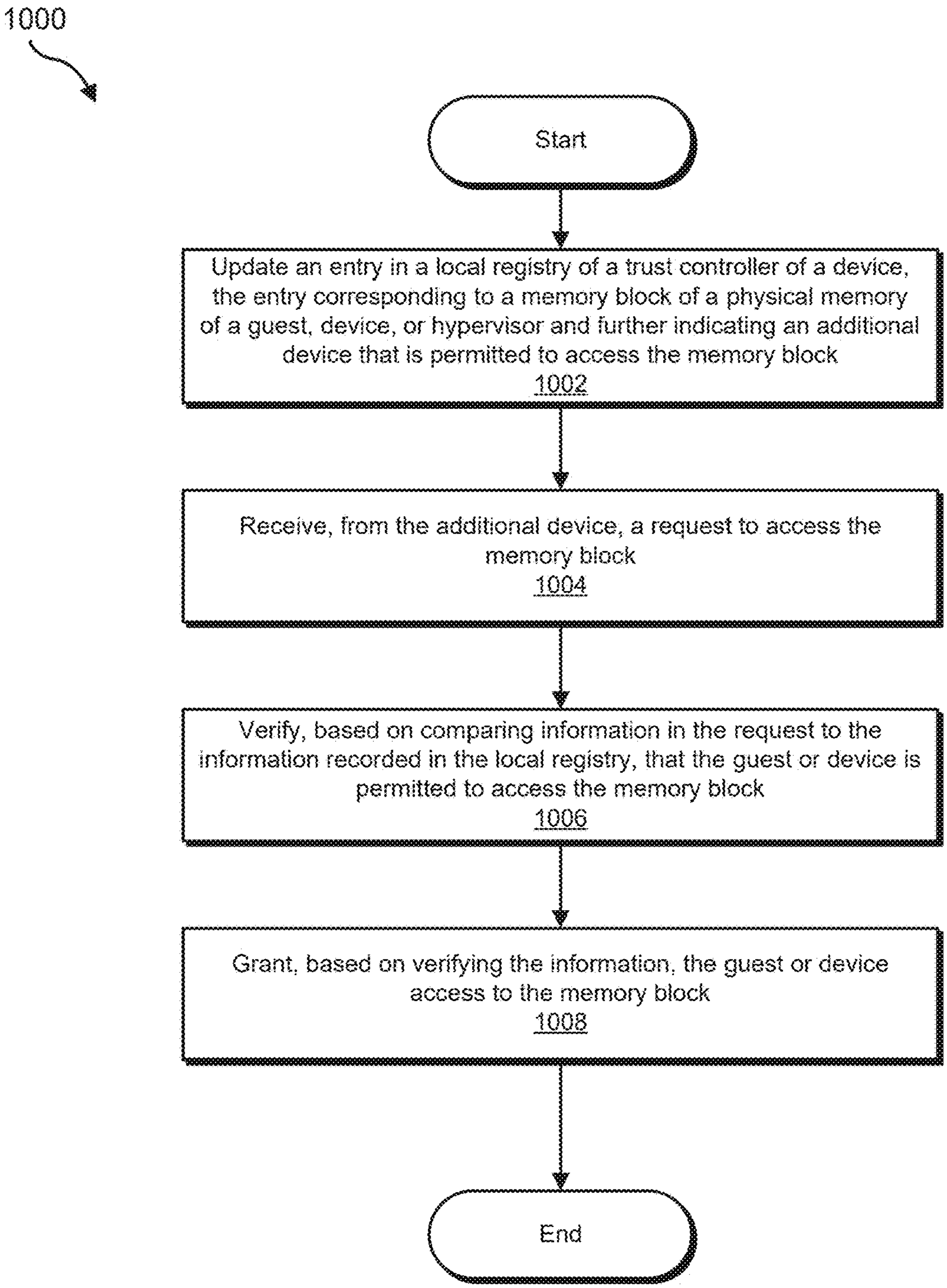
FIG. 10 is a flow diagram of an exemplary computer-implemented method for enforcing confidential computing.

FIG. 10 is a flow diagram of an exemplary computer-implemented method 1000 for confidential computing. The steps shown in FIG. 10 can be performed by any suitable circuit, computer-executable code and/or computing system, including the system(s) illustrated in FIGS. 1-9. In one example, each of the steps shown in FIG. 10 represent an algorithm whose structure includes and/or is represented by multiple sub-steps, examples of which will be provided in greater detail below.

As illustrated in FIG. 10, at step 1002 one or more systems described herein update an entry in a local registry of a trust controller of a device. As described in greater detail above, an entry corresponding to a memory block of a physical memory of a host or device can indicate if a particular guest, device, or hypervisor is permitted to access the memory block. For example, when a host device assigns ownership of a portion of host memory to a guest, device, or hypervisor, the host system can add a corresponding entry to the record of trust controller, modify an existing entry, and/or delete an old or out of date entry.

At step 1004 one or more of the systems described herein receive, from the additional device, a request to access the memory block. For example, an additional device can transmit a memory access request in the form of a CXL.cache command over fabric to host device.

At step 1006, one more of the systems described herein, verify, based on comparing information in the request to the information recorded in the local registry, that the guest, device, or hypervisor is permitted to access the memory block. For example, trust controllers can perform a source validation check to verify whether the host has granted the guest, device, or hypervisor permission to access the requested memory block.

At step 1008 one or more of the systems described herein grant, based on verifying the information, the guest, device, or hypervisor access to the memory block. For example, if an identifier of the guest, device, or hypervisor matches an identifier included in an entry for the memory block stored the record of trust controller, then the trust controller will grant guest, device, or hypervisor access to the requested block of host memory.

The present disclosure is generally directed to systems and methods for a trust controller that can be included with any device that itself includes a memory to ensure confidential computing of the guest data. Typically, an MMU, or a memory management unit, can manage memory requests routed to the ATC or an address translation cache. However, an MMU does not manage all memory requests, nor does it validate the source device. Trust controllers can conduct source validation and verify the ownership for access to the attached memory without requiring additional verification from the host device. For example, if a guest, device, or hypervisor requests access to a memory block of a host device's memory, a trust controller associated with the memory of the host device can perform a check to validate source ownership of the guest, device, or hypervisor and verify whether the host device has granted the guest, device, or hypervisor permission to access the requested memory block. Additionally, the trust controller can provide access control allowing a new owner to update its own local trust controller for any affected addresses. Similarly, if a guest, device, hypervisor, or host requests access to a memory block of a non-host device that includes its own memory, a trust controller included in the non-host device can perform the relevant checks and block unauthorized attempts to access the memory.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using controllers that perform certain tasks. These controllers can include script, batch, or other executable files that can be stored on a computer-readable storage medium or in a computing system. In some implementations, these controllers can configure a computing system to perform one or more of the example implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:

a device-attached memory; and a trust controller that is configured to:

maintain a record of identifiers corresponding to valid requests to access the device-attached memory; and verify, based on the record, attempts to access the device-attached memory, wherein verifying the attempts to access the device-attached memory comprises examining a source of a memory request and a guest identifier included in the memory request.

2. The device of claim 1, wherein updates to the record of the trust controller are issued from a host system that is communicatively coupled to the device.

3. The device of claim 2, wherein the host system comprises a memory management unit that initiates the updates to the record of the trust controller.

4. The device of claim 3, wherein a memory request bypasses the memory management unit of the host system.

5. The device of claim 2, wherein a memory request by the host system to access a host-owned memory of the device-attached memory bypasses the trust controller of the device.

6. The device of claim 2, wherein a memory request by the device to access a host-owned memory is routed through a trust controller of the host system.

7. The device of claim 2, wherein a memory request by the host system to access a host-owned memory is routed through the trust controller of the device.

8. The device of claim 2, wherein a memory request by the device to access the device-attached memory is routed through the trust controller of the device.

9. The device of claim 2, wherein:

the device issues a request to access a host-owned block of the device-attached memory;

the host system updates ownership of the host-owned block of the device-attached memory, thereby changing the host-owned block of the device-attached memory to a device-owned portion of the device-attached memory; and the device routes the request to the device-owned portion of the device-attached memory.

10. The device of claim 2, wherein updates to the record are broadcasted to each device connected to the host system.

11. The device of claim 1, wherein the device requests to access an additional device-attached memory communicatively coupled to an additional device.

12. The device of claim 1, wherein the trust controller of the device is configured to:

receive updates to the record; and verify, based on the updated record, an identifier corresponding to a memory request.

13. The device of claim 1, wherein examining the source of the memory request comprises examining an identifier of the source of the memory request, and the guest identifier includes or is based on an identifier of an address space.

14. The device of claim 1, wherein:

an update to the record specifies a change in ownership of a block of memory of the device-attached memory; and the device-attached memory sanitizes the block of memory in response to receiving the update.

15. The device of claim 14, further comprises flushing a local cache of the device in response to receiving the update.

16. A system comprising:

a host device, the host device comprising:

a host memory;

a host trust controller that is configured to:

maintain a record of identifiers corresponding to valid requests to access the host memory;

receive updates to the record; and verify, based on the record, attempts to access the host memory, wherein verifying the attempts to access the host memory comprises examining a source of a memory request and a value included in the memory request, wherein the value includes or is based on an identifier of an address space; and an additional device that stores data in the host memory.

17. The system of claim 16, wherein a memory request directed to a local cache of the host device is routed to the additional device in response to a cache miss at the host device.

18. The system of claim 16, wherein the host trust controller is configured to:

verify, based on an update to the record, whether the additional device is permitted to access the host memory.

19. The system of claim 16, wherein updates to the record are broadcasted to each device connected to the host device.

20. A method comprising:

updating an entry in a local registry of a trust controller of a device, the entry corresponding to a memory block of a physical memory of the device and further including identifiers corresponding to valid requests to access the memory block;

receiving a request to access the memory block;

verifying, based on comparing information in the request to information recorded in the local registry, that the request is a valid request to access the memory block, wherein the verifying comprises examining a source of a memory request and a value included in the memory request, wherein the value includes or is based on an identifier of an address space; and granting, based on verifying the information in the request, access to the memory block.

* * * * *